Patented Aug. 17, 1943

2,327,017

UNITED STATES PATENT OFFICE 2,327,017

TREATMENT OF WELLS PRODUCING MINERAL FLUID

Leonard C. Chamberlain, Midland, Mich., assignor to The Dow Chemical Company, Midland, Mich., a corporation of Michigan No Drawing. Application March 15, 1937, Serial No. 131,018

5 Claims. (Cl. 252—8.55)

The invention relates to an improved method of facilitating the production of wells yielding petroleum oil. It more particularly concerns a method of increasing the flow of oil from an oil-producing stratum to a well drilled thereinto or therethrough.

In the course of my investigations on the rate of flow of mineral fluids through cores taken from earth and rock formations I have found that the usual measurements of the permeability to oil do not fully explain the observed rate of flow of the oil to the well. The observed rate of flow of oil, for example, through the interstices of the earth or rock itself is, as a general rule, much less than that corresponding to the rate expected in view of the size of the voids or passages in the formation as determined by the usual permeability tests.

It has now been discovered that the interstices in earth or rock formations producing oil do not offer an adequate passage for the flow of oil to the well in many cases because these generally contain more or less water, the presence of which reduces their flow capacity for oil. I have found, by examining natural cores obtained by core drilling formations that yield oil without any water, that the interstices of such cores contain a very considerable quantity of water (or brine) which is not displaced when the oil flows through these passages to the well. Such water is generally referred to as "connate water." In the conventional methods of drilling deep wells, as by the rotary method employing drilling mud to carry the cuttings out of the well and to consolidate the walls thereof, water seeps into the interstices of the producing formation reducing their flow capacity for oil in similar manner to that of connate water. I have also found that, by removing such water from the cores examined, a greatly increased rate of flow of oil through the cores can be obtained without dissolving the earth or rock material of the cores. By the foregoing tests it has been ascertained that the rate of production of oil from a producing stratum into an oil well generally can be substantially increased by treating the producing stratum with an agent facilitating the removal of the connate water which is not displaced by the normal passage of the oil to the well. The invention, then, consists of the method hereinafter fully described and particularly pointed out in the claims.

In the treatment contemplated by my process I inject into the oil-producing stratum a liquid of non-acid character which is capable of absorbing water and producing therewith a non-acid aqueous solution substantially free from solid suspended matter and having a substantially lower surface tension than that of water itself. Examples of suitable liquids for the purpose are: the water-soluble alcohols such as methyl, ethyl, propyl, butyl, and isopropyl alcohol; water-soluble ketones such as methyl ketone and acetone; the water-soluble phenols, cresols, xylenols, and the like; and aqueous solutions thereof, which in absorbing water form aqueous solutions of non-acid character exhibiting a substantially lower surface tension than that of water itself. The amount of such liquid to be employed largely depends upon the degree of permeability of the formation and the extent to which it is to be treated. For example I have found that from 50 to 1500 gallons or more may be employed with beneficial results. After the liquid is injected the next step, which is carried out consecutively, is to permit the liquid, together with its absorbed water to return to the well, as by putting the well into production.

In carrying out the method, if desired, the well may be first filled with oil to render it hydrostatically controllable before the treating liquid is introduced into the well, as in the usual practice of acidizing wells by the process described in Patent No. 1,891,667, when the liquid to be employed has a higher specific gravity than that of oil. The liquid then may be introduced into the well, either through the tubing or the casing, while a corresponding volume of oil is allowed to escape from the top of the casing or the tubing, as the case may be, until the liquid has reached the base of the well and risen in the well bore to near the top of the producing formation. Then the tubing or the casing may be closed, as the case may be, and pressure applied to the liquid, if necessary, by forcing in an additional quantity thereof or by following it with a load of oil so as to inject the liquid into the formation. If the liquid to be employed has a lower specific gravity than that of oil, a convenient method for its introduction into the formation is to place a packer around the tubing just above the producing formation and then inject the liquid into the formation through the tubing. The next step, carried out in immediate succession after the liquid has been injected into the formation, is to put the well into production by bailing, pumping, or allowing the well to flow. When production is thus resumed, the liquid comes out of the formation, carrying with it the connate water from the producing formation surrounding the well and thus increases the available pore space for the oil to reach the well. In actual practice the foregoing method has been found to bring about a very substantial increased rate of production of oil in the case of wells producing mainly oil.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:

1. In a method of treating a petroleum oil-bearing stratum penetrated by a well bore, the steps, carried out consecutively, which consist first in introducing alone into the well bore and thence into the stratum a water-soluble surface tension lowering non-acid liquid agent selected from the group consisting of a water-soluble phenol, cresol, and xylenol, and second putting the well into production.

2. In a method of treating a petroleum oil-bearing stratum penetrated by a well bore, the steps carried out consecutively which consist first in introducing alone into the well bore and thence into the oil-bearing stratum a water-soluble surface tension lowering non-acid liquid ketone, and second putting the well into production.

3. In a method of treating a petroleum oil-bearing stratum penetrated by a well bore, the steps carried out consecutively which consist first in introducing alone and under pressure into the well bore and thence into the oil bearing stratum a water-soluble surface tension lowering compound and second putting the well into production.

4. A method of increasing the production of an oil or gas well comprising introducing alone into the well a lower aliphatic alcohol, forcing said alcohol into the interstices of the producing formation to contact and dissolve water adsorbed therein and subsequently without contacting the formation with any aqueous treating agent withdrawing said alcohol together with the dissolved water from said formation and subsequently producing said well.

5. A method according to claim 4 in which the alcohol is ethyl alcohol.

LEONARD C. CHAMBERLAIN.